US012500005B2

(12) United States Patent
Melcher et al.

(10) Patent No.: US 12,500,005 B2
(45) Date of Patent: Dec. 16, 2025

(54) NUCLEAR REACTOR HEAD, NUCLEAR REACTOR COMPRISING SUCH A NUCLEAR REACTOR HEAD AND METHOD OF MAINTAINING A NUCLEAR REACTOR

(71) Applicant: Framatome Inc., Lynchburg, VA (US)

(72) Inventors: Ryan Melcher, Lynchburg, VA (US); Charles Graves, Forest, VA (US)

(73) Assignee: Framatome Inc.

( * ) Notice: Subject to any disclaimer, the term of this patent is extended or adjusted under 35 U.S.C. 154(b) by 299 days.

(21) Appl. No.: 17/765,771

(22) PCT Filed: Oct. 3, 2019

(86) PCT No.: PCT/US2019/054443
§ 371 (c)(1),
(2) Date: Mar. 31, 2022

(87) PCT Pub. No.: WO2021/066831
PCT Pub. Date: Apr. 8, 2021

(65) Prior Publication Data
US 2022/0375633 A1    Nov. 24, 2022

(51) Int. Cl.
*G21C 13/036*    (2006.01)
(52) U.S. Cl.
CPC .................. *G21C 13/036* (2013.01)
(58) Field of Classification Search
CPC .... G21C 13/032; G21C 13/036; G21C 13/04; G21C 13/067; G21C 7/12; G21C 19/04; G21C 19/16; G21C 19/20
USPC ................. 376/204, 236, 285, 286
See application file for complete search history.

(56) References Cited

U.S. PATENT DOCUMENTS 5,053,189 A    10/1991  Chrise et al.
5,307,661 A    5/1994   Fink et al.

FOREIGN PATENT DOCUMENTS

| FR | 2701785 A1 | 8/1994 |
| FR | 2727560 A1 | 5/1996 |
| JP | H0836081 A | 2/1996 |
| JP | 2001208888 A | 8/2001 |
| WO | WO-2020205079 A2 * | 10/2020 ............... F16D 3/06 |

OTHER PUBLICATIONS

Corresponding Search Report for PCT/US2019/054443.

* cited by examiner

*Primary Examiner* — Jinney Kil
(74) *Attorney, Agent, or Firm* — Davidson Kappel LLC

(57) ABSTRACT

A nuclear reactor head (12) comprising a vessel top head (14), a penetration (36) extending through the vessel top head (14) along a penetration axis (B) for allowing passage of a control shaft (34) of a control rod drive mechanism (32) through the vessel top head (14) and to a corresponding control guide tube (30) of the nuclear reactor (2), the penetration (36) comprising a penetration tube (38) extending through the vessel top head (14) and a thermal sleeve (40) extending inside the penetration tube (38) and coaxially with the penetration tube (38) with an axial play between the thermal sleeve (40) and the penetration tube (38), wherein the nuclear reactor head further comprises a spacer (60) attached to a lower end of the thermal sleeve (40) for maintaining minimal spacing with the upper end of the corresponding control rod guide tube (30).

9 Claims, 5 Drawing Sheets

NUCLEAR REACTOR HEAD, NUCLEAR REACTOR COMPRISING SUCH A NUCLEAR REACTOR HEAD AND METHOD OF MAINTAINING A NUCLEAR REACTOR

TECHNICAL FIELD

The invention pertains to the field of nuclear fuel reactors comprising a reactor core housed in a nuclear reactor vessel, movable control rods housed inside the nuclear reactor vessel to be moved inside and outside the reactor core for adjusting the reactivity of the reactor core, and control rod drive mechanisms located outside the nuclear reactor vessel for moving the control rods.

BACKGROUND OF THE INVENTION

A nuclear reactor is comprised of a reactor core housed in a nuclear reactor vessel, which includes a vessel shell and a vessel top head closing the top end of the vessel shell. The reactor core contains fissile material. In use, a coolant fluid flows through the reactor core. The coolant fluid has the function of moderating the nuclear reaction and retrieving heat from the reactor core.

The nuclear reactor also comprises control rods that are movable inside and outside the reactor core for adjusting the reactivity of the reactor core. The control rods contain material that absorbs neutrons generated by the fissile material.

Inserting the controls rods into the reactor core diminishes the reactivity of the reactor core and removing the control rods from the reactor core increases the reactivity of the reactor core.

The nuclear reactor comprises control rod drive mechanisms configured for moving the control rods. The control rods are gathered into control rod assemblies. Each control rod assembly includes several control rods rigidly attached together. Each control drive mechanism drives one respective control rod assembly.

Each control rod drive mechanism is located outside the reactor vessel and drives a control rod assembly via a shaft that extends though the vessel top head via a penetration.

Each penetration extends through the vessel top head along a penetration axis and comprises a penetration tube fixed to the vessel top head, along with a thermal sleeve located inside the penetration tube with limited clearance along the penetration axis. This limited clearance allows movement of the thermal sleeve relative to the penetration tube along the penetration axis.

The thermal sleeve suspends inside the penetration tube. The thermal sleeve has an enlarged upper end portion that sits on a bearing surface of the penetration tube, which is for retaining the thermal sleeve axially.

The lower end of the thermal sleeve protrudes inside the penetration tube that is inside the nuclear reactor vessel. The lower end of the thermal sleeve is in register with the upper end of a control rod guide tube. The drive shaft extends inside the thermal sleeve and into the control rod guide tube.

As the thermal sleeve suspends inside the penetration tube with an axial clearance, premature wear may occur in the contact area between the thermal sleeve and the penetration tube.

SUMMARY OF THE INVENTION

One of the aims of the invention is to better control this premature wear phenomenon.

To this end, a nuclear reactor head is provided comprising a vessel top head, a penetration extending through the vessel top head along a penetration axis for allowing passage of a control shaft of a control rod drive mechanism through the vessel top head and to a corresponding control guide tube of the nuclear reactor, the penetration comprising a penetration tube extending through the vessel top head and a thermal sleeve extending inside the penetration tube and coaxially with the penetration tube with an axial play between the thermal sleeve and the penetration tube, wherein the nuclear reactor head further comprises a space attached to a lower end of the thermal sleeve for maintaining minimal spacing with the upper end of the corresponding control rod guide tube.

The spacer provided at the lower end of the thermal sleeve limits the downward movement of the thermal sleeve relative to the penetration tube, thus avoiding wear at the contact area between the thermal sleeve and the penetration tube.

It is possible to retrofit the spacer at the lower end of the thermal sleeve in parallel to maintenance operations that require opening the nuclear reactor vessel by removing the reactor vessel head.

The addition of a spacer at the lower end of a thermal sleeve is not critical and has no impact on safety of the nuclear reactor. It is easy to manufacture the spacer with a low cost.

In specific embodiment, the nuclear reactor vessel head comprises one, or several of the following features, taken in isolation or according to any technically feasible combination:

- the thermal sleeve comprises a lower end portion diverging downwardly, the spacer being attached to a lower edge of the lower end portion;
- the lower end portion of the thermal sleeve is frustoconical;
- the spacer has openings for allowing fluid to flow radially when the spacer is in contact with the control rod guide tube;
- the spacer has an openwork structure;
- the spacer comprises legs having upper ends attached to the lower end of the thermal sleeve and lower ends, the legs defining between them openings extending circumferentially between the legs relative to the penetration axis;
- the spacer comprises a seating ring axially spaced from the lower end of the thermal sleeve and legs connecting the seating ring to the lower end of the thermal sleeve, the legs being spaced and distributed circumferentially;
- the spacer is attached to the thermal sleeve with fasteners and/or by welding;
- the spacer is attached to the thermal sleeve via one or several fixing elements, each fixing element being a rivet or a threaded element.

The invention also provides a nuclear reactor comprising a reactor vessel, the reactor vessel comprising a vessel shell and a nuclear reactor head as defined above, the vessel top head of the nuclear reactor head closing an upper opening of the vessel shell, a control rod guide tube located inside the reactor vessel, a control rod assembly guided inside the control rod guide tube, a control rod drive mechanism located outside the reactor vessel, comprising a control shaft extending through the penetration and connected to the control rod assembly for controlling movement of the control rod assembly inside the control rod guide tube.

The invention also provides a method of maintenance of a nuclear reactor comprising a reactor vessel, the reactor vessel comprising a vessel shell and a nuclear reactor head comprising a vessel top head closing an upper opening of the vessel shell, a penetration extending through the vessel top head along a penetration axis for allowing passage of a control shaft of a control rod drive mechanism through the vessel top head and to a corresponding control rod guide tube of the reactor, the penetration comprising a penetration tube extending through the vessel top head and a thermal sleeve provided inside the penetration tube and coaxially with the penetration tube with an axial play relative to the penetration tube, the maintenance method comprising attaching a spacer to a lower end of the thermal sleeve for maintaining a minimal spacing with the upper end of the corresponding control rod guide tube.

BRIEF DESCRIPTION OF THE DRAWINGS

The best understanding of the invention and its advantages comes by reading the following description given solely as a non-limiting example, and made with reference to the appended drawings, in which.

DETAILED DESCRIPTION OF PREFERRED EMBODIMENTS

Figure 1:
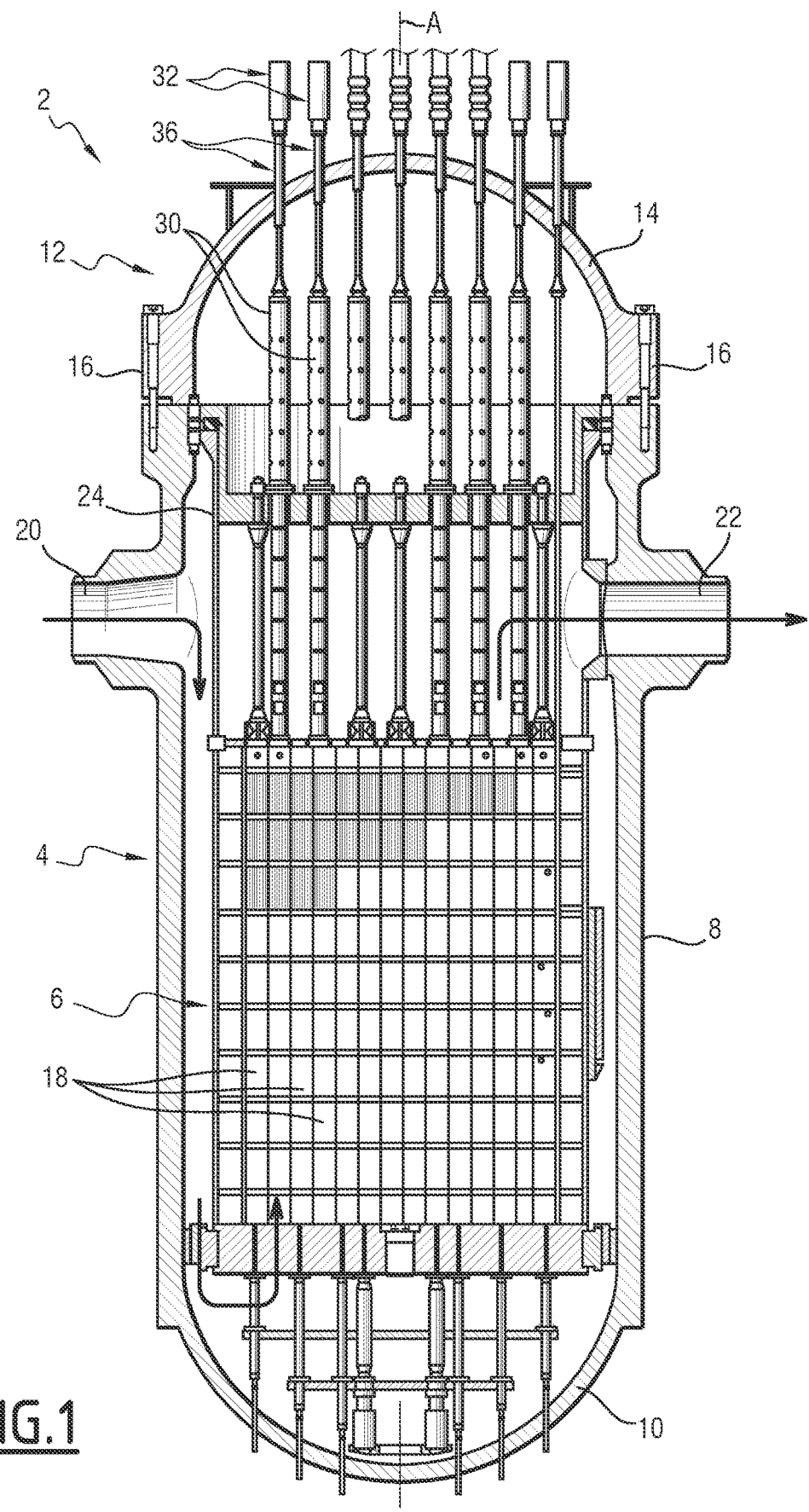
FIG. 1 is a cross-sectional view of a nuclear reactor.

The nuclear reactor 2 of FIG. 1 comprises a nuclear reactor vessel 4 containing a reactor core 6.

The nuclear reactor vessel 4 has a substantial vertical central axis A. In the following, the terms "vertical", "horizontal", "upper", "lower", "bottom" and "top" are in reference to the vertical central axis of the reactor vessel.

The nuclear reactor vessel 4 comprises a substantially cylindrical vessel shell 8 extending along the central axis A and a vessel bottom head 10 closing the bottom end of the vessel shell 8. The vessel shell 8 has an opening at the top end thereof.

The nuclear reactor vessel 4 comprises a nuclear reactor head 12 that includes a vessel top head 14 closing the top end of the vessel shell 8. The vessel top head 14 is removable and attached to the vessel shell 8 via screws 16.

The reactor core 6 includes fissile material. The reactor core 6 is made of a plurality of nuclear fuel assemblies 18 that are arranged side-by-side inside the nuclear reactor vessel 4. Each nuclear fuel assembly 18 typically comprises a bundle of fuel rods supported by an armature in a spaced relationship with each fuel rod containing fissile material.

The nuclear reactor vessel 4 has coolant fluid inlets 20, coolant flow outlets 22, and an internal sleeve 24 surrounding the reactor core 6. In use, coolant fluid entering the coolant fluid inlets 20 flows downwardly, outside the internal sleeve 24, enters the internal sleeve 24 at a bottom end, and then flows vertically upward inside the internal sleeve 24 through the reactor core 6, before exiting the nuclear reactor vessel via the coolant flow outlets 22.

The nuclear reactor 2 comprises control rods 26 that are movable inside and outside the reactor core to adjust the reactivity of the reactor core 6. The control rods 26 contain neutron-absorbing material.

Inserting the controls rods 26 into the reactor core 6 diminishes the reactivity of the reactor core 6, and removing the control rods 26 from the reactor core 6 increases the reactivity of the reactor core 6.

The control rods combine into control rod assemblies 28. Each control rod assembly 28 comprises a bundle of control rods 26.

The nuclear reactor 2 comprises control rod guiding tubes 30. Each control rod guiding tube 30 is located inside the nuclear reactor vessel 4 above the reactor core 6, and receives a respective control rod assembly 28 that slides vertically inside the control rod guiding tube 30.

Each control rod guiding tube 30 provides guidance for the corresponding control rod assembly 28 to ensure that each control rod 26 remains aligned with the corresponding space provided in the reactor core 6.

The nuclear reactor comprises control rod drive mechanisms 32 that are configured for moving the control rods 26, specifically the control rod assemblies 28. Each control drive mechanism 32 is associated to one respective control rod assembly 28.

Figure 2:
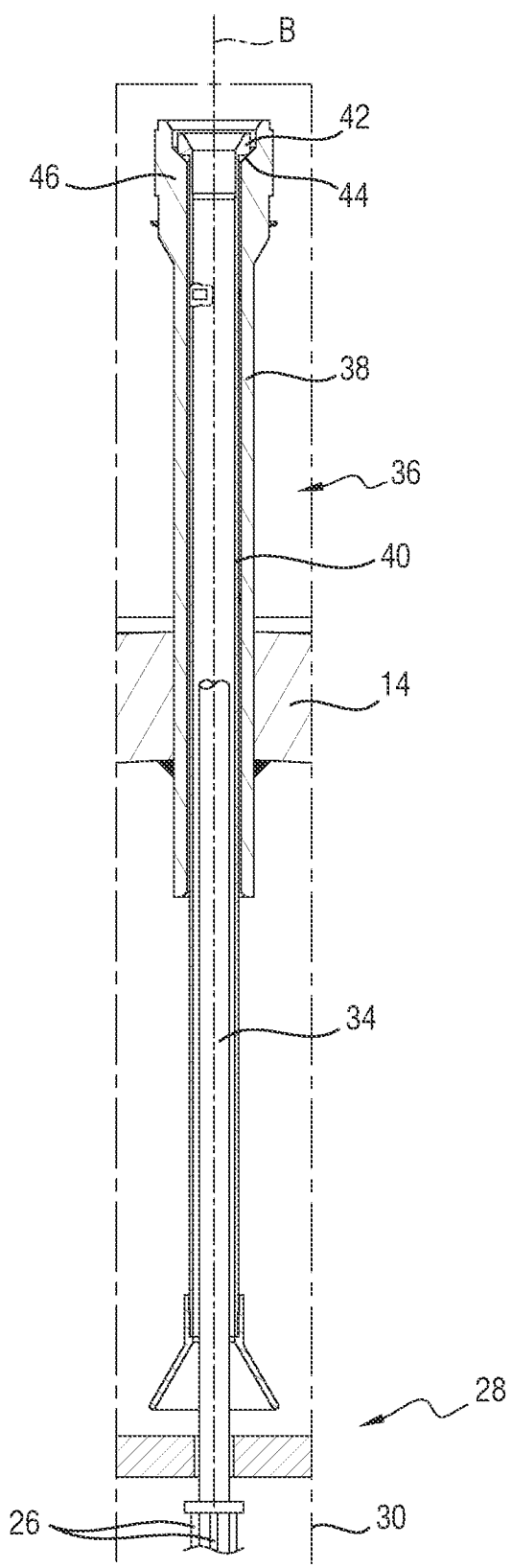
FIG. 2 is a cross-sectional view of a penetration of a nuclear reactor head of the nuclear reactor of FIG. 1.

Each control rod drive mechanism 32 is located outside the reactor vessel 4 and drives a respective control rod assembly 28 via a drive shaft 34 (FIG. 2) that extends though the vessel top head 14. Each drive shaft 34 connects a respective control rod drive mechanism 32 to the corresponding control rod assembly 28 through the vessel top head 14.

The nuclear reactor head 12 comprises penetrations 36 extending through the vessel top head 14. Each penetration 36 has the configuration to receive a respective drive shaft 34. Each drive shaft 34 is slidably received inside the corresponding penetration 36.

Each penetration 36 extends through the vessel top head 14 along a penetration axis B, and is comprised of a penetration tube 38 fixedly attached to the vessel top head 14 and a thermal sleeve 40 that is received inside the penetration tube 38.

Each thermal sleeve 40 receives the corresponding penetration tube 38 with a limited clearance along the penetration axis B. This limited clearance allows a movement of the thermal sleeve relative to the penetration tube along the penetration axis.

Each thermal sleeve 40 suspends inside the corresponding penetration tube 38, via an upper end portion 42 of the thermal sleeve 40. The thermal sleeve 40 has an enlarged upper end portion 42 that seats onto the seating surface 44 of the penetration tube 38 for retaining the thermal sleeve 40 axially.

The penetration tube 38 is comprised of an enlarged upper end portion 46. The upper end portion 42 of the thermal sleeve 40 is received inside the enlarged upper end portion 46 of the penetration tube 38. The seating surface 44 of the penetration tube 38 is located inside the enlarged upper end portion 46.

The lower end of the thermal sleeve 40 protrudes from the penetration tube 38 inside the nuclear reactor vessel 4. The lower end of the thermal sleeve 40 for each penetration 36 is in register with the upper end of the corresponding control rod guide tube 30. The drive shaft 34 extends inside the thermal sleeve 40 as well as into the control rod guide tube 30.

Figure 3:
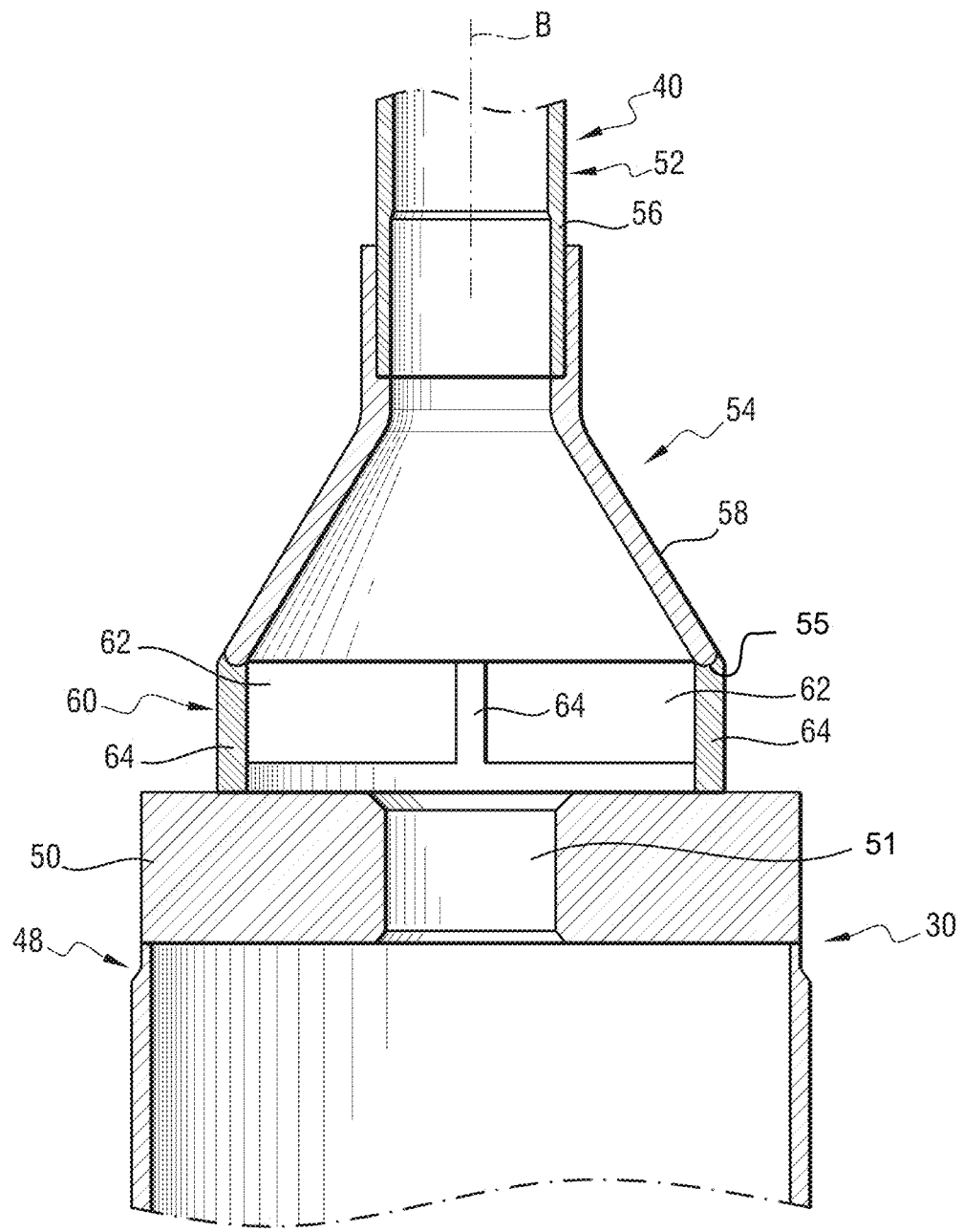
FIG. 3 is a cross-sectional view of a lower end portion of a thermal sleeve of the penetration of FIG. 2 further illustrating an upper portion of a control rod guide tube.

As illustrated on FIG. 3, the upper end 48 of the control rod guide tube 30 is closed by a cover plate 50 that is provided with an opening 51 for the passage of the drive shaft 34. The opening 51 is aligned with the penetration axis B.

The thermal sleeve 40 has successively along the penetration axis B the upper end portion 42, an intermediate portion 52, and a lower end portion 54. The intermediate portion 52 extends between the upper end portion 42 and the lower end portion 54.

The lower end portion 54 of the thermal sleeve 40 diverges downwardly. The lower end portion 54 of the thermal sleeve 40 is frustoconical. The lower end portion 54 of the thermal sleeve 40 is a circular cross-section with a diameter that gradually increases towards the lower end of the thermal sleeve 40.

The intermediate portion 52 is cylindrical with a constant cross-section along the penetration axis B. The intermediate portion 52 has a circular cross-section.

In one example, the intermediate portion 52 is made of a thermal sleeve tube 56, the lower end portion 54 being made of a frustum 58 attached to the thermal sleeve tube by welding or by means of a threaded connection.

The thermal sleeve 40 is provided with a spacer 60 attached at a lower edge 55 of the thermal sleeve 40. The spacer 60 is configured to maintain an axial spacing between the lower end of the thermal sleeve 40 and the corresponding control rod guide tube 30, at least after a predetermined wear of the thermal sleeve 40 located at the interface of the seating surface 44 for the penetration tube 38.

The spacer 60 is configured to contact the control rod guide tube 30 after a predetermined amount of wear between the upper end section of the thermal sleeve 42 and the seating surface 44 of the penetration tube 38.

The spacer 60 is configured for allowing coolant fluid to flow radially, relative to the penetration axis B between the lower end of the thermal sleeve 40 and the corresponding control rod guide tube 30.

The spacer 60 has an open framework.

The spacer 60 comprises openings 62 distributed circumferentially around the penetration axis B for allowing coolant fluid to flow radially through the spacer 60 relative to the penetration axis B.

The spacer 60 comprises spacing legs 64 attached to the lower end of the thermal sleeve 40, and extending downwardly from the lower end of the thermal sleeve 64 to abut on the control rod guide tube after wearing in.

In one exemplary embodiment, the spacer 60 comprises a seating ring 66 spaced from the lower end of the thermal sleeve 38 along the penetration axis B, the seating ring 66 being configured to the corresponding control rod guide tube 30 after wearing in.

Figure 4:
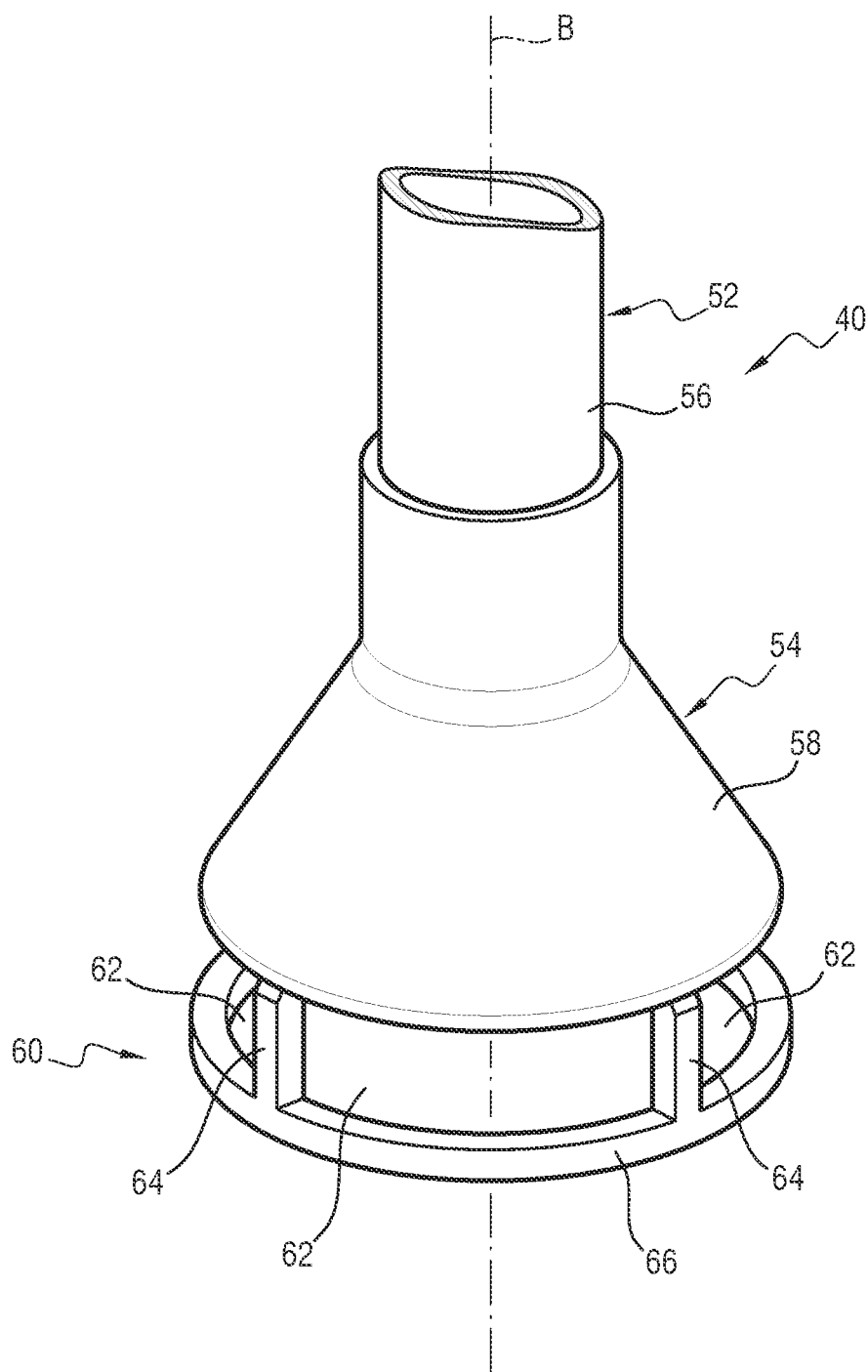
FIG. 4 is a perspective assembly view of the lower end portion of the thermal sleeve equipped with a spacer.
Figure 5:
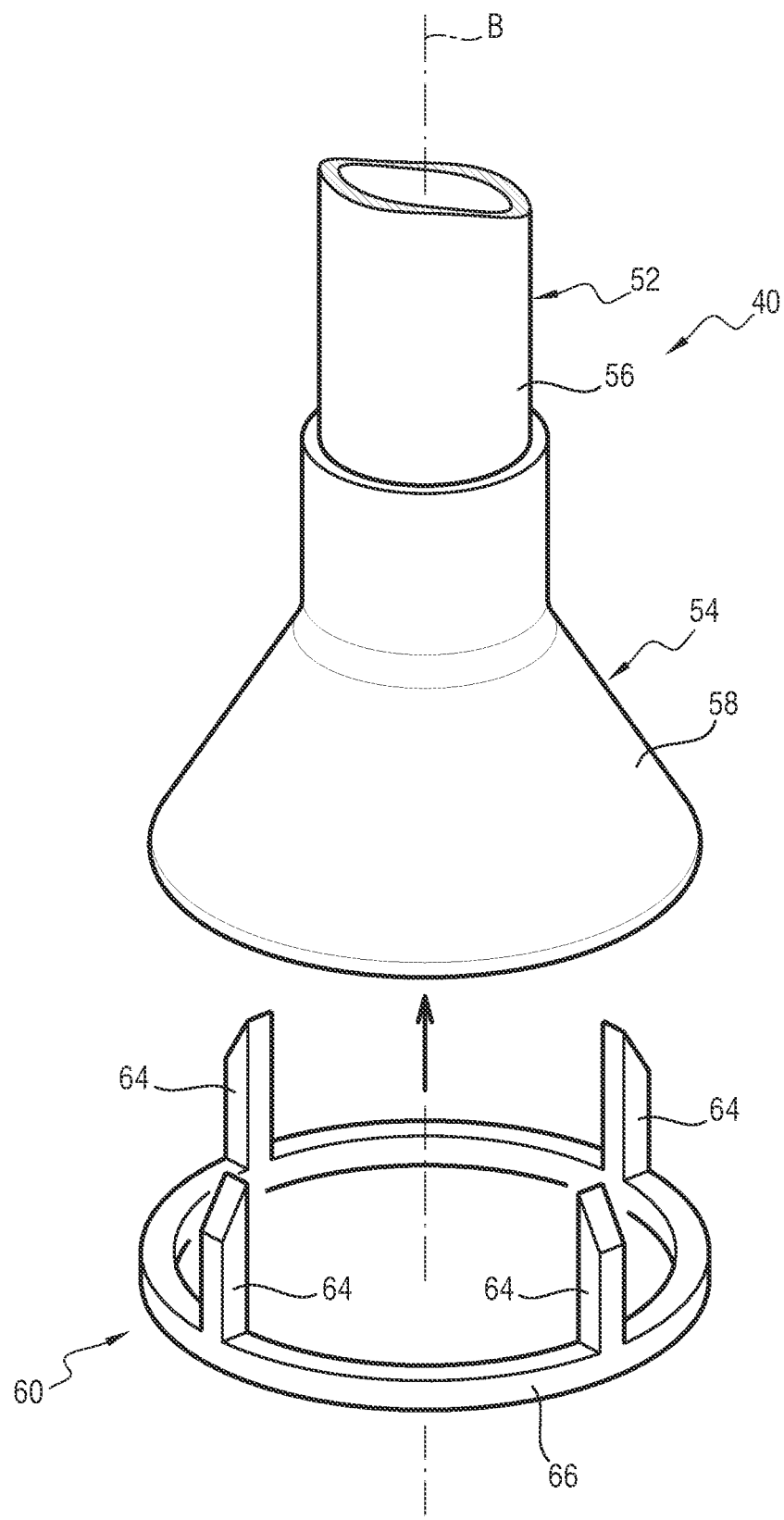
FIG. 5 is a perspective exploded assembly view of the lower end portion and the spacer before assembly.

As illustrated in FIGS. 3 and 4, the spacer comprises a seating ring 66 that attaches to the lower end of the thermal sleeve 40 via a plurality of spacing legs 64 extending downwardly from the lower end of the thermal sleeve 40.

The spacing legs 64 are distributed circumferentially. Flow openings 62 are delimited axially between the lower end of the thermal sleeve 40 and the seating ring 66 and circumferentially between the spacing legs 64.

Several flow openings 62 are distributed circumferentially. Each flow opening 62 is delimited circumferentially between two adjacent legs 64 and axially between the lower end of the thermal sleeve 40 and the seating ring 66.

The flow openings 62 allow coolant fluid to enter or exit the control rod guide tube 30 during normal operation. When dropping the control rods 26 in an emergency stop of the nuclear reactor 2, the control rods 26 fall and the thermal sleeve raises up, allowing coolant fluid flow upwards in to the control rod drive mechanism.

The spacer 60 initially separates from the thermal sleeve 40 and attaches to the thermal sleeve 40.

The spacer 60 attaches to the thermal sleeve 40 with fasteners, such as rivets and/or screws, in particular threaded fasteners, such as screws. Alternatively or optionally, the spacer 60 attaches to the thermal sleeve 40 by welding.

A method of maintaining a nuclear reactor 2 is applied to the nuclear reactor 2 in which at least one thermal sleeve 40, and in particular each thermal sleeve 40, is not equipped with a spacer 60 attached to the lower end of the thermal sleeve 40.

The maintenance method is implemented during a stop of the nuclear reactor 2. The maintenance method comprises removing the vessel top head 14 from the vessel shell 8 and attaching a spacer 60 to a lower end of a thermal sleeve 40.

Owing to the invention, it is possible to avoid a premature wear of the upper end of the thermal sleeve that would need replacing of the thermal sleeve 40. Attaching a spacer 60 at the lower end of the thermal sleeve 40 can be performed during normal maintenance operation, and is much easier than replacing a thermal sleeve 40.

The invention claimed is:

1. A nuclear reactor head comprising:
a vessel top head;
a penetration extending through the vessel top head along a penetration axis for allowing passage of a control shaft of a control rod drive mechanism through the vessel top head and to a corresponding control rod guide tube of the nuclear reactor, the penetration comprising a penetration tube extending through the vessel top head and a thermal sleeve extending inside the penetration tube and coaxially with the penetration tube with an axial play between the thermal sleeve and the penetration tube; and
a spacer attached to a lower end portion of the thermal sleeve for maintaining axial spacing with an upper end of the corresponding control rod guide tube, the spacer comprising a seating ring attached to the lower end portion of the thermal sleeve via a plurality of legs of the seating ring, flow openings each being circumferentially delimited by a corresponding two of the plurality of legs, the flow openings each being delimited axially by the lower end portion of the thermal sleeve and the seating ring.

2. The nuclear reactor head according to claim 1, wherein the lower end portion diverges radially while extending downwardly to a lower edge of the lower end portion, the spacer being attached to the lower edge of the lower end portion.

3. The nuclear reactor head according to claim 2, wherein the lower end portion of the thermal sleeve is frustoconical.

4. The nuclear reactor head according to claim 1, wherein the flow openings for are configured to allow fluid to flow radially when the spacer is in contact with the corresponding control rod guide tube.

5. The nuclear reactor head according to claim 1, wherein the plurality of legs have upper ends attached to the lower end portion of the thermal sleeve.

6. The nuclear reactor head according to claim 1, wherein the spacer is attached to the thermal sleeve with fasteners and/or by welding.

7. The nuclear reactor head according to claim 1, wherein the spacer is attached to the thermal sleeve via one or several fixing elements, each fixing element being a rivet or a threaded element.

8. A nuclear reactor comprising:
a reactor vessel, the reactor vessel comprising
a vessel shell and
the nuclear reactor head according to claim 1, the vessel top head of the nuclear reactor head closing an upper opening of the vessel shell, a control rod guide tube located inside the reactor vessel, a control rod assembly guided inside the control rod guide tube, a control rod drive mechanism located outside the reactor vessel, the control rod drive mechanism comprising a control shaft extending through the penetration and connected to the control rod assembly for controlling movement of the control rod assembly inside the control rod guide tube.

9. A method of maintenance of a nuclear reactor comprising a reactor vessel, the reactor vessel comprising a vessel shell and the nuclear reactor head as recited in claim 1, the maintenance method comprising:

attaching the spacer to the lower end portion of the thermal sleeve.

\* \* \* \* \*